United States Patent [19]

McGinn

[11] 4,105,997
[45] Aug. 8, 1978

[54] METHOD FOR ACHIEVING ACCURATE OPTICAL CHARACTER READING OF PRINTED TEXT

[75] Inventor: James W. McGinn, Wheaton, Md.

[73] Assignee: United States Postal Service, Washington, D.C.

[21] Appl. No.: 758,742

[22] Filed: Jan. 12, 1977

[51] Int. Cl.² ............................................. G06K 9/18
[52] U.S. Cl. ................. 340/146.3 ED; 340/146.1 AL
[58] Field of Search ............ 340/146.1 AL, 146.1 AJ, 340/146.3 ED, 146.3 C; 235/153 AM; 358/284, 257, 263

[56] References Cited

U.S. PATENT DOCUMENTS

| | | | |
|---|---|---|---|
| 3,303,463 | 2/1967 | Hamburgen | 340/146.1 AJ |
| 3,465,287 | 9/1969 | Kennedy et al. | 340/146.1 AL |
| 3,582,881 | 6/1971 | Burton | 340/146.1 AL |
| 3,678,469 | 7/1972 | Freeman et al. | 340/146.1 AL |
| 3,859,630 | 1/1975 | Bennett | 340/146.1 AL |

*Primary Examiner*—Leo H. Boudreau
*Attorney, Agent, or Firm*—Luther A. Marsh

[57] ABSTRACT

A method of preparation of printed text for optical character reading is disclosed. In addition, a method of checking for errors in the optical character reading of the prepared test is disclosed. The basis of the text preparation method is to add check symbols to each line of text during its preparation. The check symbols are produced by sequentially processing the ASC II code for the printed alpha-numeric characters as a dividend where the divisor is the bit sequence of a unique generating polynomial code. The remainder bits of this division operation are then translated to be check symbols which accompany the line of printed text. The basis of the check method is as follows: During optical character reading of the text, the line of information text including check symbols is processed in a routine manner to produce an ASC II code serial bit stream for the alpha-numeric character and check symbols. The alpha-numeric portion of the bit stream is then processed by the unique generating polynomial code. The remainder bits from this process are then compared with the bit equivalents of the check symbols to determine whether the line has been read correctly by the optical character reader. If the line has been read correctly, the information bit stream, including check symbols, is released for subsequent operation. If the line has not been read correctly, the optical character reading operation is either recycled or the line of text is transformed by facsimile for subsequent operation.

9 Claims, 3 Drawing Figures

SIGNAL FLOW FOR OCR PROCESSING

LEGEND
OUTPUT 1: RELEASE ASCII CODE FOR SUBSEQUENT OPERATIONS.
OUTPUT 2: RELEASE ASCII CODE FOR OPTIONAL REPROCESSING.

SIGNAL FLOW FOR TEXT PREPARATION

GENERATING POLYNOMIAL CIRCUIT

LEGEND
☐ : 1 BIT SHIFT REGISTER
⊕ : EXCLUSIVE OR (MODULO 2 ADDITION)

SIGNAL FLOW FOR OCR PROCESSING

LEGEND
OUTPUT 1: RELEASE ASCII CODE FOR SUBSEQUENT OPERATIONS.
OUTPUT 2: RELEASE ASCII CODE FOR OPTIONAL REPROCESSING.

SIGNAL FLOW FOR TEXT PREPARATION (COLUMN FORMAT)

SIGNAL FLOW FOR OCR PROCESSING (COLUMN FORMAT)

LEGEND

OUTPUT 1 - RELEASE ASCII CODE FOR SUBSEQUENT OPERATIONS.
OUTPUT 2 - RELEASE ASCII CODE FOR OPTIONAL REPROCESSING.

METHOD FOR ACHIEVING ACCURATE OPTICAL CHARACTER READING OF PRINTED TEXT

RELATION OF INVENTION

This invention relates to a method of preparation of printed text for optical character reading in conjunction with a method of checking for errors in the optical character reading of the prepared text. More particularly, this invention relates to a sensing methodology which indicates optical character reader error(s) during routine optical character reader processing of the previously prepared printed text. Accuracy of the optical character reader can then easily be determined.

PRIOR ART

Current state of the art optical character reader error(s) yield approximately $1 \times 10^{-4}$ which is totally unacceptable for accurate electronic message service. Moreover, current state of the art optical character readers are mostly utilized in reviewing redundant type messages wherein such an error rate is very adequate. The use of optical character readers in an U.S. Postal Service environment relates to nonredundant material substantially all the time, that is, each message unit is unique and different and must be transmitted and reproduced for the recipient verbatim while at the same time being managed at all times in a confidential manner.

OBJECTS OF THE INVENTION

It is an object of this invention to provide a method of preparation of printed text for optical character reading in conjunction with a method of checking for errors in the optical character reading of the prepared text. An example of this invention is to have an optical character reader method wherein upon reading of each line of the information text, the accuracy of the information text is readily discernible.

A further object of this invention is to provide a methodology which indicates optical character reader error(s) during optical character reader processing of a line of information text.

Another object of this invention provides a methodology of forcing character recognition for each element in each line of the printed text allowing continuous knowledge of accuracy for the processing by the optical character reader.

Another object of this invention is to detect the occurrence within a single line of optical character reader scanned text of a single character error containing up to 8-bit errors, a sequence of paired character errors which contain up to 16-bit errors and a sequence of triple character errors containing up to 24-bit errors.

These and other more specific objects of the invention will become apparent from the following and more detailed description of the invention, as illustrated in the accompanying drawings, wherein:

RELATION OF DRAWINGS TO INVENTION

FIG. 1 is an arrangement in block diagram of the ASC II code signal flow from the printer input through the correctable line buffer to the generating polynomial coding circuit as shown in FIG. 2 which operates to produce the unique 24-bit remainder. The translation of the remainder bits to octal numerals is performed by routing these bits to a look-up table, binary to octal, in the translator whose output is then used as printing commands.

Figure 2:
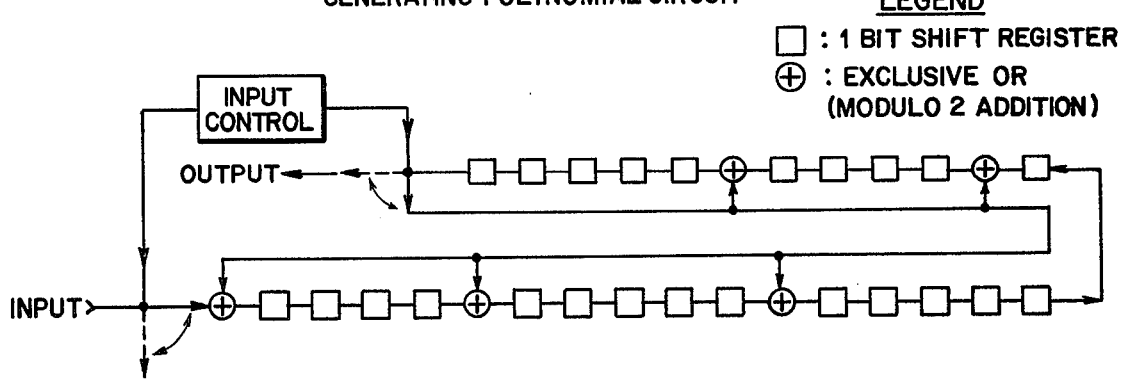
FIG. 2 is an arrangement in block diagram of the generating polynomial coding circuit which operates to produce the unique 24 bit remainder.
Figure 4:
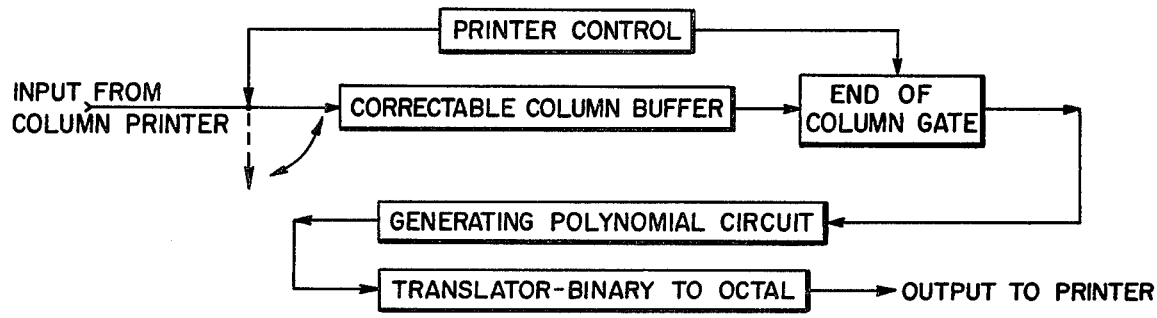

FIG. 4 is an arrangement in block digram of the ASCII code signal flow from the printer input through the correctable column buffer to the generating polynomial coding circuit as shown in FIG. 2 which operates to produce the unique 24-bit remainder. The translation of the remainder bits to octal numerals is performed by routing these bits to a look-up table, binary to octal, in the translator whose output is then used by printing commands.

Figure 5:
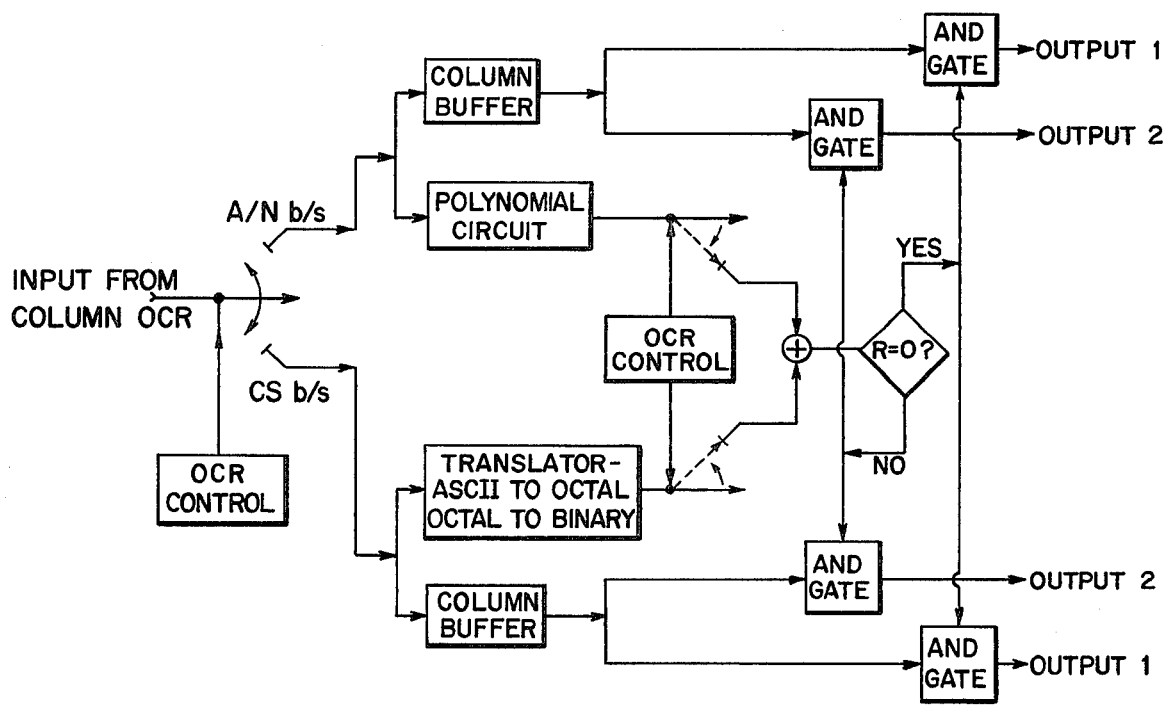

FIG. 5 is an arrangement in block diagram of the ASCII code signal flow from the optical character reader through the column buffer for those portions of the bit stream that correspond to (i) alpha-numeric characters within the line of printed text, and (ii) check symbols which occur in the right margin space of the completed line of printed text.

RELATION OF REQUIREMENTS TO INVENTION

This invention requires that the text to be processed is composed in one or more of a limited number of type fonts for which character recognition is possible by use of an optical character reader. The text used in this invention also is prepared in accordance with normal business standards, such as, sufficient print contrast ratio, no erasures, no overprints, etc. This invention illustrates typewritten generation of page text, however, the invention is equally applicable to the entry of variable information on forms by computer driven printers and other regular printers.

In a standard maximum 132 character typewritten line, a suitable electrical signal which represents the USASC II code for each character, space or symbol is generated. The sequence of electrical signals generated by all characters in the line is entered into an arrangement of one bit shift registers and modulo 2 adders. A one bit shift register is a two-state (0 to 1) device that accepts, holds and transmits a serial bit stream at a 1-bit rate. A modulo 2 adder is a two input, one output device which accepts two 1-bit inputs, performs a binary addition on the inputs and transmits the addition (1 bit).

Figure 1:
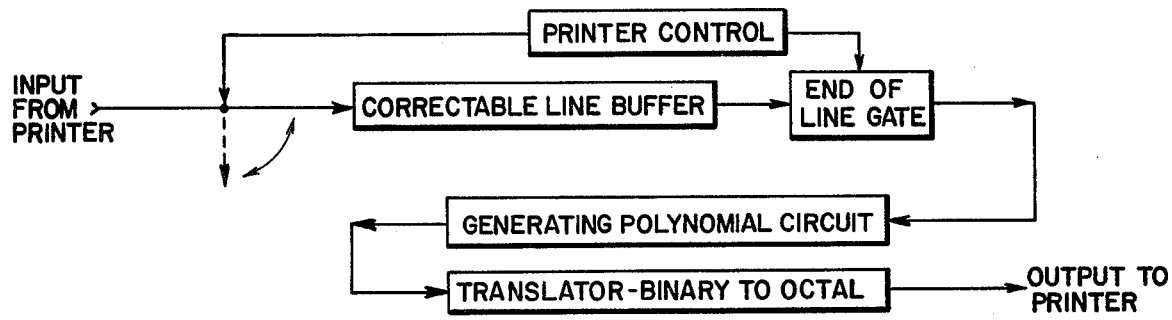
Figure 3:
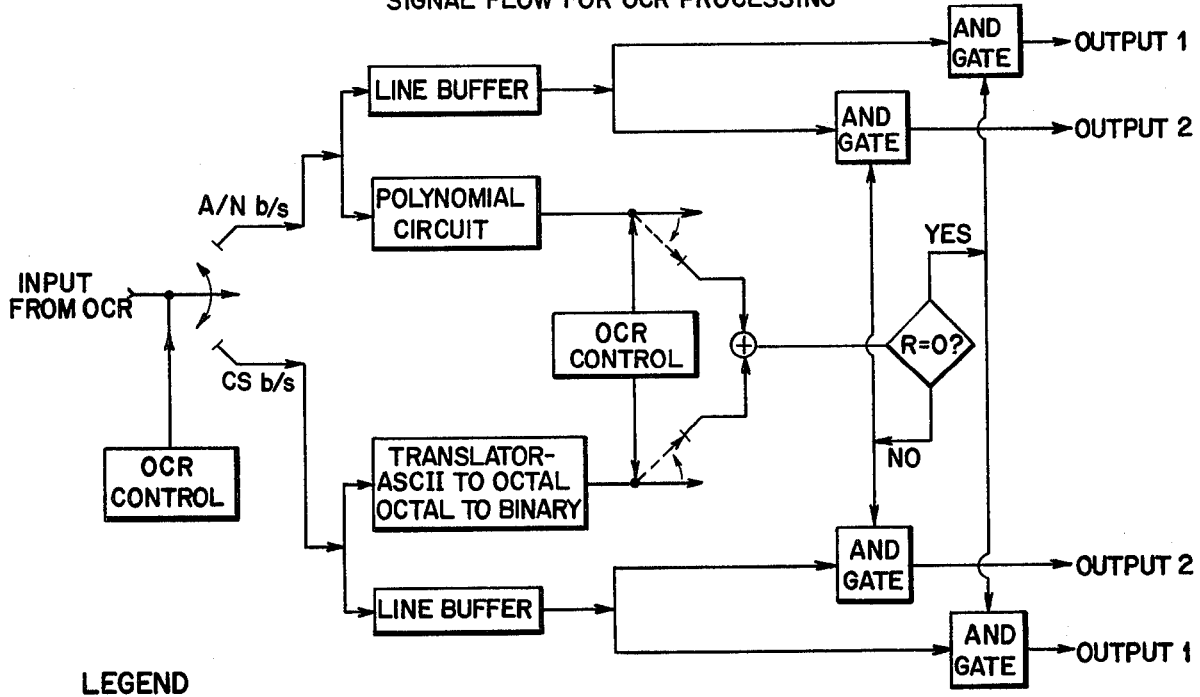
FIG. 3 is an arrangement in block diagram of the ASC II code signal flow from the optical character reader for those portions of the bit stream that correspond to (i) alpha-numeric characters within the line of printed text, and (ii) check symbols which occur in the right margin space of the completed line of printed text.

FIG. 1 illustrates an arrangement in block diagram of the ASC II code signal flow from the printer input through the correctable line buffer to the generating polynomial coding circuit as shown in detail in FIG. 2 which operates to produce the unique 24 bit remainder in accordance with this invention. The alpha-numeric stream of characters within the line of printed text as shown in FIG. 3 is input to a line buffer and the generating polynomial circuit as shown in FIG. 2. The polynomial circuit then operates to produce the unique 24 bit remainder. The check symbol stream is input to a line buffer and to two look-up tables — ASC II to octal, octal to binary — in the translator. The translator then operates to produce the unique bit sequence which is the translation of the original 8 octal numeral check symbols. The 24 bit remainder and the unique bit sequence are then added by modulo 2. The sums obtained by this addition are then used to select flow paths for the line buffered alpha-numeric and check symbol streams in accordance with either of the reprocessing options as enunciated in claim 2(d).

The application of polynomial codes to the detection of errors in optical character reader processing of printed text is used in this invention because of their simplicity of operation and their efficiency in detection of bit errors that occur in burst forms.

RELATION OF DEFINITIONS TO INVENTION

The following definitions of terms are enunciated to ease understanding in accordance with this invention. Printed check symbols are numerical characters added to a line of printed text as a code for the translation of the line. Information symbols are the alpha-numeric symbols and other symbols, for example, space, colon, period, etc. Remainder bits are those bits which are not divisible by the polynomial code divisor. A polynomial code device is an electronic circuit which emulates the operation of dividing the bit stream produced by a line of text (when expressed in ASC II, American Standard Code for Information Exchange) by a polynomial code (expressed in bits) to obtain a remainder term (in bits). A circuit of this type is shown in Teleprocessing Network Organization, J. Martin, Prentiss-Hall 1970, pages 91–93. An ASC II code serial bit stream equivalent is a sequence of bits produced when printed text is encoded in the American Standard Code for Information Exchange. A serial bit stream is a sequence of bits, e.g., 0's or 1's. A unique 8 bit ASC II code is a 7-bit code which results from encoding a printed alpha numeric character according to the American Standing Code for Information Interchange. To these 7 bits is added an 8 bit as a parity check. Characters, spaces or symbols are things that can be realized by a typewriter or computer line printer. An ancillary MICR is a device which can read check symbols in magnetic ink format. Octal check numerals are numerals that result when the 24 check bits are converted to octal (base eight) arithmetic. Check numerals bits involve translating the octal check numerals back into bit arithmetic (base two). Translating in this invention means operation of optical character reader in recognizing printed characters and generating ASC II 8-bit code equivalents. Error in translating is an operation of the optical character reader which misrecognizes a printed character, for example, recognizes $d$ for $b$, and generates ASC II 8 bit code for $d$. Successful translation is an operation which recognizes a printed character and generates a matching ASC II 8 bit code. Optical character reader scan information (video) is the high frequency voltage signals that result from raster scanning of a line of printed text. A facsimile processor is a circuit which accepts scan information (video) and processes such voltages for facsimile transmission. A sensing technique is a method of manipulating optical character reader translations of printed line text, in bit form, with check numerals, in bit form, to make a decision as to the success or failure of the optical character reader processor. Sensing mechanism operations are the manipulation of the optical character reader translations and check numerals via a polynomial code device. A signal processor is an electronic device that can accept optical character scan information (video) and process such information for facsimile transmission. Variable information is a line of alpha numeric characters generated as tabular data entries on forms under the control of computer driven line printers. A one bit shift register is a two-state, 0 or 1, device that accepts, holds and transmits a serial bit stream at a one bit rate. Only one bit shift registers are useful in this invention. A modulo 2 adder is a two input, one output device which accepts two 1-bit inputs, performs a binary addition on the inputs and transmits the addition, 1 bit. A higher order character identification is an assuming of two levels of optical character reader operation, that is, rejected line information from first level, for example, correlation type, optical character reader processing can be reprocessed at a second, more complex, processing level, for example, feature: line, curve analysis. An all zero's output is the addition of the check numeral bit sequence and the code remainder sequence can only have two possible outputs. The first: zero or all zero's signifies that the optical character reader translation is correct. The second: non-zero, any non-zero sum, signifies that the optical character reader translation is incorrect.

A facsimile signal is a signal which can be used in a facsimile device to reproduce the line of printed text. A polynomial code is a bit sequence which represents a polynomial, for example, the polynomial $x^9+x^7+x^3+x^2+1$ can be written as the polynomial code 1010001101. Bit errors that occur in burst form are a group of incorrect bits within one data message or block. For ASC II coding the message or block is 8 bits in length. An 8 bit error burst is the length of an error burst, in this case 8, is the number of bits in a group having at least its first and eighth bits in error. An error burst is a burst of errors in a group having incorrect bits within one data message or block. Fire codes are a class of polynomial codes. See "A Class of Multiple-Error Correcting Binary Codes for Non-Independent Errors," Standard Electrical Laboratories, P. Fire, TR55, Apr. 1959. The characters or symbols used are those selected by the typewriter operator (secretary) or compute line printer program as the authors of the line of text. Each character or symbol so chosen has a unique 8-bit ASC II code equivalent. Therefore, a line of text composed of such characters or symbols has a sequence of bits, 8 times number of characters or symbols, which can be represented by a sequence of electrical symbols, for example, on-off voltage pulses. And, a coding circuit operation is an electronic circuit which accepts the accumulated original and replaced electrical signals from the line buffer and carries out the shift register and modulo-2 adding operations shown in FIGS. 1 and 2 to obtain a remainder term of 24 bits.

RELATION OF APPLICATION(S) TO INVENTION

The application of polynomial codes in the OCR (OPTICAL CHARACTER READER) environment assumes that character error generation is a random phenomena based on anomalies in the printed characters. The generation rate for carefully prepared original text in acceptable fonts is low, typically $10^{-4}$ or one misread character on the average in a 10,000 character text. When a single character error occurs in text processing it is evidenced by at most an 8-bit error burst in the ASC II code stream produced by the OCR as input into the polynomial code device. Two such character error bursts in sequence, that is, up to a 16-bit error burst can occur when the OCR misreads two adjacent characters. The most likely occurrence of this phenomenon is when a misrecognized character is immediately repeated, for example, a character pair in the text. The probability of occurrence of this phenomenon is approximately 10 times or one order of magnitude less than the single character error rate. The occurrence of three character error bursts in sequence, that is, up to a 24-bit error burst is rare. The most likely occurrence involves the sequence of a character pair error and a separate and different character error. The probability of occurrence of this phenomenon is approximately $10^{-9}$.

A polynomial divisor or generating polynomial of degree 24 assures 100% detection for errors that occur as described above. Such a polynomial which provides such error detection performance is $x^{24}+x^{19}+x^{15}+x^9+x^4+1$. This particular polynomial is one of a class of algebraic functions known as Fire Codes. This code in actual operation is capable of accurate detection of all single bursts of bit errors up to 24-bits in length, any combinations of two bursts of errors where the shorter burst is no greater than 9-bits in length and where the sum of the lengths of bursts is no greater than 16-bits. This polynomial is also capable of detection of other longer bursts of bit errors. From a pure noise theory point of view, some bursts of bit errors greater than 24-bits in length are undetectable in the operation of a coding device configured as shown in FIG. 2, however, the probability of such occurrences is of the order of $10^{-8}$. Thus, the efficiency of detection of the coding apparatus for bursts in excess of 24-bits in length is greater than $1-10^{-8}$.

In this invention during normal OCR processing of the information text, rather than character rejection, character recognition is forced for each element in each line of the information text. For each recognition, the OCR causes the generation of the proper electrical signals which represent the ASC II code for the character, space or symbol identified. The alpha-numeric character identification logic of the OCR (Optical Character Reader) is adjustable to such an extent so that all characters and check symbols within a line of text are read and that a complete serial ASC II bit stream is produced. The sequence of signals obtained from each line of text is entered into the matching polynomial code device. The 24-bit output obtained from the processing of this line of text signals is retained for addition with the bit eqivalent of the 8 check numerals associated with the line of text. The reading of the check numerals in accordance with this invention can either be performed by the OCR as part of its text processing or be performed separately by an MICR device working in parallel with the optical character reader. In either performance the check numeral bit sequence is added (modulo 2) to the 24-bit polynomial code remainder output and the resulting bit sequence is examined for an all-zeros output.

The information text is assumed correct when an all-zeros output is obtained and the OCR character translation information is passed for subsequent operations. If a non-zero output of the addition process is obtained, the OCR has made an error in its identification of a character in the processed line of information text. If a non-zero output is obtained then the scanner video signals for the line of information text can be recycled for a higher order or more sophisticated character identification processing by the OCR and the checking operations are repeated and a second attempt is made to obtain an all-zeros output. If a non-zero output of the addition process persists, the OCR character translation information is rejected and the scanner video signals are routed to a signal processor which translates the information text line as a facsimile signal.

In another embodiment of this invention the unique sequence of electrical signals representing the US ASCII code equivalents of the line of text is accumulated, character by character, in a correctable line buffer memory prior to entry into the polynomial coding device as shown in FIG. 2. The function of the line bufffer is to allow for the accumulation of signals in typewriter sequence within a line of text, the deletion (erasure) of certain of the signals within the line which represent characters, spaces, or symbols that the typewriter operator may wish to be removed, and the replacement of deleted signals within the line by signals representing characters or symbols that the typewriter operator may wish to substitute for deleted signals. The correctable line buffer allows the production of a correctable line of text in accordance with this embodiment of the invention.

At the completion of each line of text, the sequence of accumulated originals and replaced signals is actuated by an end of line gate, under typewriter operator control, to enter the polynomial coding device. Actuation of the end of line gate enables the coding circuit operation in an automatic manner including the typing of the check bit code sequence into the right margin space adjacent to the completed typewriter line of text. A block diagram of the arrangement of the line buffer, end of line gate, and polynomial circuit which performs the above correctable operations are shown in FIG. 1. Subsequent operations, after use as necessary of the correctable operations, are the same as described supra without use of the correctable memory system.

In a further embodiment of this invention the printing of the original text is performed in a column format and wherein the check symbols obtained by processing a column of characters are printed in a column format under the character column in a margin space available at the bottom of the printed page. Further, the optical character reading is performed in a column format for text printed as described above. Still further, the printing of the check symbols are carried out by the use of a magnetic ink printer working in parallel with the printer of the line of information text. And, the processing of the check symbols is performed by a magnetic ink character reader working in parallel with the optical character reader.

Many obvious modifications in the details and arrangements of parts may be made, however, without departing from the true spirit and scope of the invention, as more particularly defined in the appended claims.

I claim:

1. A method of adding check symbols to lines of printed text during the printing process which improves the accuracy of optical character reading of each line of information which comprises:
   (a) generating an electrical signal which represents the USASC II code for each alpha-numeric character produced during the printing of a line of text,
   (b) assembling the sequence of USASC II code signals so generated in a correctable line buffer,
   (c) adding, deleting and replacing USASC II code signals as appropriate in the correctable line buffer for alpha-numeric characters added, deleted and replaced as appropriate in the production of a corrected line of text, (d) unloading the USASC II code signals in the line buffer by actuating an end of the line gate at the completion of the printing and correction as appropriate of a line of text as a serial bit stream input to a generating polynomial coding circuit, (e) operating the generating polynomial code circuit to obtain a unique 24-bit remainder, (f) translating the 24-bit remainder as a sequence of eight octal numerals, and (g) printing the sequence of octal numerals so obtained as check symbols in the right margin space adjacent to the line of printed text.

2. A method in accordance with claim 1 wherein the printing of the original text is performed in a column format and wherein the check symbols obtained by processing a column of characters are printed in a column format under the character column in a margin space available at the bottom of the printed page.

3. A method in accordance with claim 2 wherein the printing of the check symbols is carried out by a magnetic ink printer working in parallel with the printer of the line of information text.

4. A method in accordance with claim 1 wherein the printing of the check symbols is carried out by a magnetic ink printer working in parallel with the printer of the line of information text.

5. A method of checking for errors in the optical character reading of lines of text which comprises:

(a) adjusting the alpha-numeric character identification logic of the OCR (Optical Character Reader) so that all characters and check symbols within the line of text are read and that a complete serial ASCII bit stream is produced, (b) processing the serial bit stream so produced for each line of text as follows:
  i. processing that portion of the bit stream generated by the OCR for alpha-numeric characters as input to a generating polynomial coding circuit;
  ii. operating the generating polynomial code circuit to obtain a unique 24 bit remainder; and
  iii. translating that portion of the bit stream generated by the OCR for check symbols as a unique 24-bit sequence;

(c) adding, modulo 2, the unique 24-bit remainder obtained in (b) (ii) supra to the unique bit sequence obtained in b.iii supra and upon obtaining a zero sum the text is released for routine subsequent operations; and (d) reprocessing is carried out as follows upon obtaining a non-zero sum for 2(c).
  i. reprocessing the original serial bit stream in accordance with (a),(b) and (c) supra for verification of the non-zero sum upon obtaining a zero sum the text is released for routine subsequent operations;
  ii. re-reading the line of printed text with an Optical Character Reader having higher order alpha-numeric character identification logic in accordance with (a),(b) and (c) for verification of the non-zero sum, upon obtaining a zero sum the text is released for routine subsequent operations, and
  iii. reprocessing in accordance with (d.)(i) and (d.)(ii) as appropriate and obtaining a non-zero sum, routing the video signals obtained by the Optical Character Reader to a signal processor for translating such signals to a facsimile format, and releasing said facsimile format for routine subsequent operations.

6. A method in accordance with claim 5 wherein the optical character reading is performed in a column format.

7. A method in accordance with claim 6 wherein the processing of the check symbols is performed by a magnetic ink character reader working in parallel with the optical character reader.

8. A method in accordance with claim 5 wherein the processing of the check symbols is performed by a magnetic ink character reader working in parallel with the optical character reader.

9. A method of preparation and optical character reading of printed text which reduces the error in the optical character reading process which comprises:

(a) generating an electrical signal which represents the USASC II code for each alpha-numeric character produced during the printing of a line of text, (b) assembling the sequence of USASC II code signals so generated in a correctable line buffer, (c) adding, deleting and replacing USASC II code signals as appropriate in the correctable line buffer for alpha-numeric characters added, deleted and replaced as appropriate in the production of a corrected line of text, (d) unloading the USASC II code signals in the line buffer by actuating an end of the line gate at the completion of the printing and correction as appropriate of a line of text as a serial bit stream input to a generating polynomial coding circuit, (e) operating the generating polynomial code cirucit to obtain a unique 24-bit remainder, (f) translating the 24-bit remainder as a sequence of eight octal numerals, (g) printing the sequence of octal numerals so obtained as check symbols in the right margin space adjacent to the line of printed text, (h) adjusting the alpha-numeric character identification logic of the OCR (Optical Character Reader) so that all characters and check symbols within the line of text are read and that a complete serial ASC II bit stream is produced, (i) processing the serial bit stream so produced for each line of text as follows:
  i. procesing that portion of the bit stream generated by the OCR for alpha-numeric characters as input to a generating polynomial coding circuit;
  ii. operating the generating polynomial code circuit to obtain a unique 24-bit remainder; and
  iii. translating that portion of the bit stream generated by the OCR for check symbols as a unique 24-bit sequence;

(j) adding, modulo 2, the unique 24-bit remainder obtained in (b).(ii) supra to the unique bit sequence obtained in (b).(iii) supra; and upon obtaining a zero sum the text is released for routine subsequent operations; and (k) reprocessing is carried out as follows upon obtaining a non-zero sum of 3(j):
  i. reprocessing the original serial bit stream in accordance with (h),(i) and (j) supra for verification of the non-zero sum, upon obtaining a zero sum the text is released for routine subsequent operations;
  ii. re-reading the line of printed text with an Optical Character Reader having higher order alpha-numeric character identification logic in accordance with (h),(i) and (j) supra for verification of the non-zero sum, upon obtaining a zero sum, the text is released for routine subsequent operations, and iii. reprocessing in accordance with (k).(i) and (k).(ii) as appropriate and obtaining a non-zero sum, routing the video signals obtained by the Optical Character Reader to a signal processor for translating such signals to a facsimile format, and releasing said facsimile format for routine subsequent operations.

* * * * *